(12) United States Patent
Usui et al.

(10) Patent No.: US 11,718,084 B1
(45) Date of Patent: Aug. 8, 2023

(54) OBJECT ADHESION/PEELING METHOD, AND OBJECT ADHESION/PEELING DEVICE

(71) Applicant: KABUSHIKI KAISHA TOSHIBA, Tokyo (JP)

(72) Inventors: Takashi Usui, Saitama Saitama (JP); Kazuo Watabe, Yokohama Kanagawa (JP); Tetsuya Kugimiya, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/898,993

(22) Filed: Aug. 30, 2022

(30) Foreign Application Priority Data

Mar. 18, 2022 (JP) .................................. 2022-044694

(51) Int. Cl.
*B32B 43/00* (2006.01)

(52) U.S. Cl.
CPC ........... *B32B 43/006* (2013.01); *Y10T 156/11* (2015.01); *Y10T 156/19* (2015.01)

(58) Field of Classification Search
CPC ..... B32B 43/006; Y10T 156/11; Y10T 156/19
See application file for complete search history.

(56) References Cited

U.S. PATENT DOCUMENTS

| | | | | |
|---|---|---|---|---|
| 2007/0269659 | A1* | 11/2007 | Gilbert | C09J 163/00 156/701 |
| 2008/0196828 | A1* | 8/2008 | Gilbert | B32B 43/006 252/500 |
| 2022/0032600 | A1* | 2/2022 | Awane | C09J 5/00 |
| 2022/0389289 | A1* | 12/2022 | Stapf | C09J 4/06 |

FOREIGN PATENT DOCUMENTS

| | | | |
|---|---|---|---|
| JP | 5503926 B2 | 5/2014 | |
| JP | 2020-200481 A | 12/2020 | |
| WO | WO-2008150228 A1 * | 12/2008 | ............. B32B 15/14 |
| WO | WO-2017064925 A1 * | 4/2017 | ............. B32B 27/00 |
| WO | WO 2021/166803 A1 | 8/2021 | |

OTHER PUBLICATIONS

C. Anduix-Canto et al., "Unraveling the Mechanism of Electrically Induced Adhesive Debonding: A Spectro-Microscopic Study," Adv. Mater. Interfaces, vol. 9, 2101447, doi: https://doi.org/10.1002/admi.202101447, 10 pages (2022).
Takamine et al., U.S. Appl. No. 17/897,451, filed Aug. 29, 2022.

* cited by examiner

*Primary Examiner* — Philip C Tucker
*Assistant Examiner* — Nickolas R Harm
(74) *Attorney, Agent, or Firm* — Finnegan, Henderson, Farabow, Garrett & Dunner, LLP

(57) ABSTRACT

An object adhesion/peeling method according to an embodiment includes adhering a adhesion target object to a second surface side of an adhesive sheet, wherein the adhesive sheet includes adhesive surfaces on a first surface side and the second surface side, and a first electrode and a second electrode provided to be adjacent to the first electrode are provided on the first surface side; adhering the first surface side of the adhesive sheet to a fixation target surface; inputting a predetermined voltage to the first electrode and the second electrode to generate a potential difference based on the predetermined voltage in a direction orthogonal to a layer thickness direction of the adhesive sheet; and causing an electrochemical reaction on the first surface side of the adhesive sheet to peel off the adhesive sheet from the fixation target surface.

9 Claims, 5 Drawing Sheets

OBJECT ADHESION/PEELING METHOD, AND OBJECT ADHESION/PEELING DEVICE

This application is based upon and claims the benefit of priority from Japanese Patent Application No. 2022-044694, filed Mar. 18, 2022; the entire contents of which are incorporated herein by reference.

FIELD

Embodiments of the present disclosure relate to an object adhesion/peeling method, and an object adhesion/peeling device.

BACKGROUND

For example, when temporarily adhering a sensor to the concrete, an adhesive, a double-sided tape, or the like is generally used. However, when the sensor is peeled off, it is possible that the adhesive or the double-sided tape remains as a residue on the concrete side. When an article to be adhered is temporarily adhered to a fixation target object and then removed again, it is desirable that no residue such as the adhesive or the like remains on the fixation target object.

In recent years, adhesives that can be easily peeled off from the adherend by applying voltage have been put to practical use. According to the technique, both the fixation target object and the adhesion target object have to be conductive, and the application range is limited.

DETAILED DESCRIPTION

Hereinafter, an object adhesion/peeling method and an object adhesion/peeling device according to an embodiment will be described with reference to the figures.

First Embodiment

Figure 1:
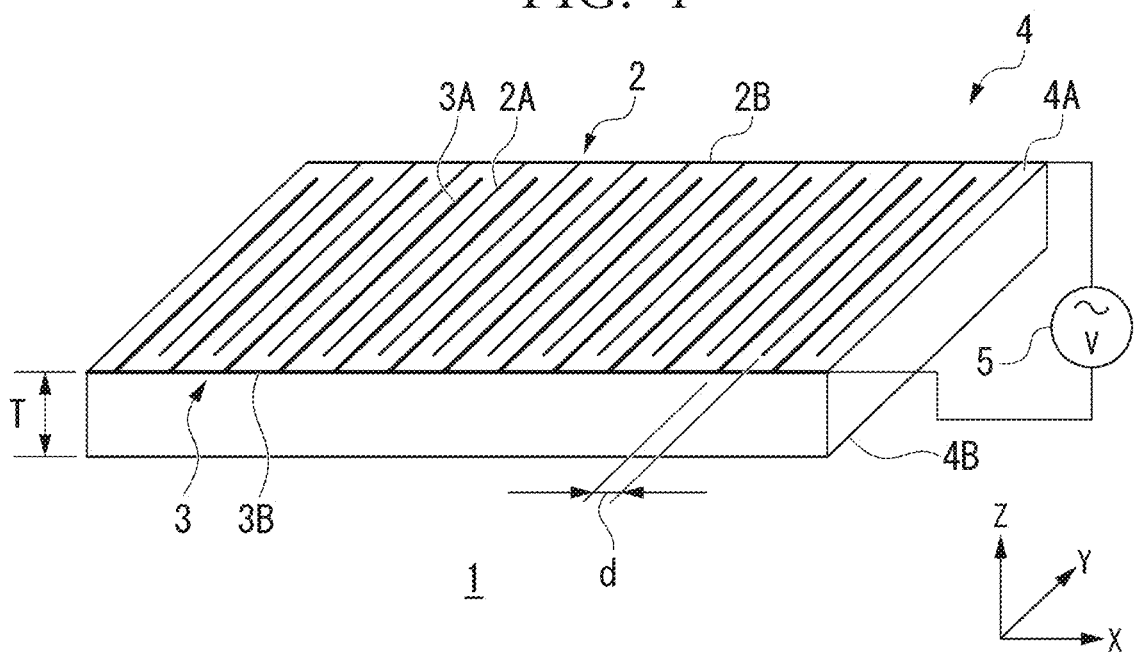
FIG. 1 is a perspective view showing a configuration of an object adhesion/peeling device according to a first embodiment.

As shown in FIG. 1, an object adhesion/peeling apparatus 1 includes a sheet-shaped adhesive sheet 4, a first electrode 2 and a second electrode 3 provided on a first surface 4A of the adhesive sheet 4, and a power supply portion 5 for applying a voltage to the first electrode 2 and the second electrode 3 are provided. The adhesive sheet 4 has, for example, adhesive surfaces on the first surface 4A side and the second surface 4B side. The first surface 4A side of the adhesive sheet 4 is, for example, adhered to the fixation target surface of the fixation target object. The fixation target object is, for example, the concrete. The adhesion target object, such as a sensor, is adhered to the second surface 4B of the adhesive sheet 4, for example. The first electrode 2 is arranged on the first surface 4A side of the adhesive sheet 4 and the second electrode 3 is arranged adjacent to the first electrode 2. The power supply portion 5 is electrically connected to the first electrode 2 and the second electrode 3.

The adhesive sheet 4 is made of, for example, an acrylic polymer adhesive using an imidazolium ionic liquid. The adhesive sheet 4 is formed of, for example, an electro-peeling adhesive layer having predetermined electrical properties. The adhesive sheet 4 is formed in a sheet shape using a material containing, for example, an acrylic polymer, an ionic liquid that is contained in the acrylic polymer and exhibits a predetermined ionic conductivity, and a migration promoter that promotes migration of the ionic liquid. The adhesive sheet 4 is applied with adhesiveness on the first surface 4A side and the second surface 4B side.

The first electrode 2 includes, for example, a plurality of first comb-teeth electrodes 2A. The plurality of first comb-teeth electrodes 2A are formed of metal linear bodies having a predetermined electrode width. The plurality of first comb-teeth electrodes 2A are arranged in parallel at predetermined intervals. The plurality of first comb-teeth electrodes 2A are electrically connected in parallel by a first connection portion 2B. The first connecting portion 2B electrically connects the proximal ends of the first comb-teeth electrodes 2A. The first connection portion 2B is electrically connected to the power supply portion 5.

The second electrode 3 includes, for example, a plurality of second comb-teeth electrodes 3A. The plurality of second comb-teeth electrodes 3A are formed of metal linear bodies having a predetermined electrode width. The plurality of second comb-teeth electrodes 3A are arranged in parallel at predetermined intervals. The plurality of second comb-teeth electrodes 3A are electrically connected in parallel by a second connection portion 3B. The second connecting portion 3B electrically connects the proximal ends of the second comb-teeth electrodes 3A. The second connection portion 3B is electrically connected to the power supply portion 5.

The second electrodes 3 and the first electrodes 2 are arranged line-symmetrically such that the comb-teeth electrodes are arranged adjacent to each other. Each first comb-teeth electrode 2A is arranged between each second comb-teeth electrode 3A. That is, each first comb tooth-shaped electrode and each second comb tooth-shaped electrode are alternately arranged adjacent to each other. Each first comb-teeth electrode 2A and each second comb-teeth electrode 3A are arranged with a separation distance d that is less than 1000 μm, for example. The electrode width of each of the first comb-teeth electrodes 2A and each of the second comb-teeth electrodes 3A is formed to be smaller than the separation distance d. It is desirable that the separation distance d is smaller than the layer thickness T of the adhesive sheet 4.

The power supply portion 5 inputs a predetermined voltage to the first electrode 2 and the second electrode 3 via the first connection portion 2B and the second connection portion 3B, respectively. The predetermined voltage is an AC voltage having a predetermined frequency. It is desirable that the predetermined frequency is, for example, equal to or less than 1000 Hz, and it is preferable that the predetermined frequency is equal to or less than 10 Hz in order to more definitely cause the peeling which will be described later. The power supply portion 5 applies a potential difference between the first electrode 2 and the second electrode 3 to generate the potential difference based on the predetermined voltage in a surface direction of the adhesive sheet 4 perpendicular to a layer thickness direction (normal direction) of the adhesive sheet 4. The power supply portion 5 is configured to cause an electrochemical reaction so as to peel the adhesive sheet 4 from the fixation target surface in a state in which the adhesion target object is fixed to the second surface 4B side and the first surface 4A side of the adhesive sheet 4 is adhered to the fixation target surface.

It is known that the acrylic polymer adhesive using the imidazolium ionic liquid as the material of the adhesive sheet 4, is used for electrical peeling on the adhesive surface. For example, in a case in which the acrylic polymer adhesive formed in a sheet shape is provided on both sides with the electrodes on the anode side and the cathode side facing each other, it is known that a chemical reaction occurs based on the potential difference given between the two electrodes on the anode side and the cathode side such that the adhesive strength is lowered.

When the potential difference is applied between the electrodes in adhesive sheet in which two electrodes on the anode side and the cathode side are provided, hydrogen bubbles are generated at the cathode side electrode. The generated air bubbles tear off the gap between the cathode side electrode and the adhesive sheet, thereby significantly decreasing the adhesive force. The size of the generated air bubbles is about 1 μm to 100 μm. Within this range, the adhesive force between the electrode and adhesive sheet 4 is decreased.

Figure 2:
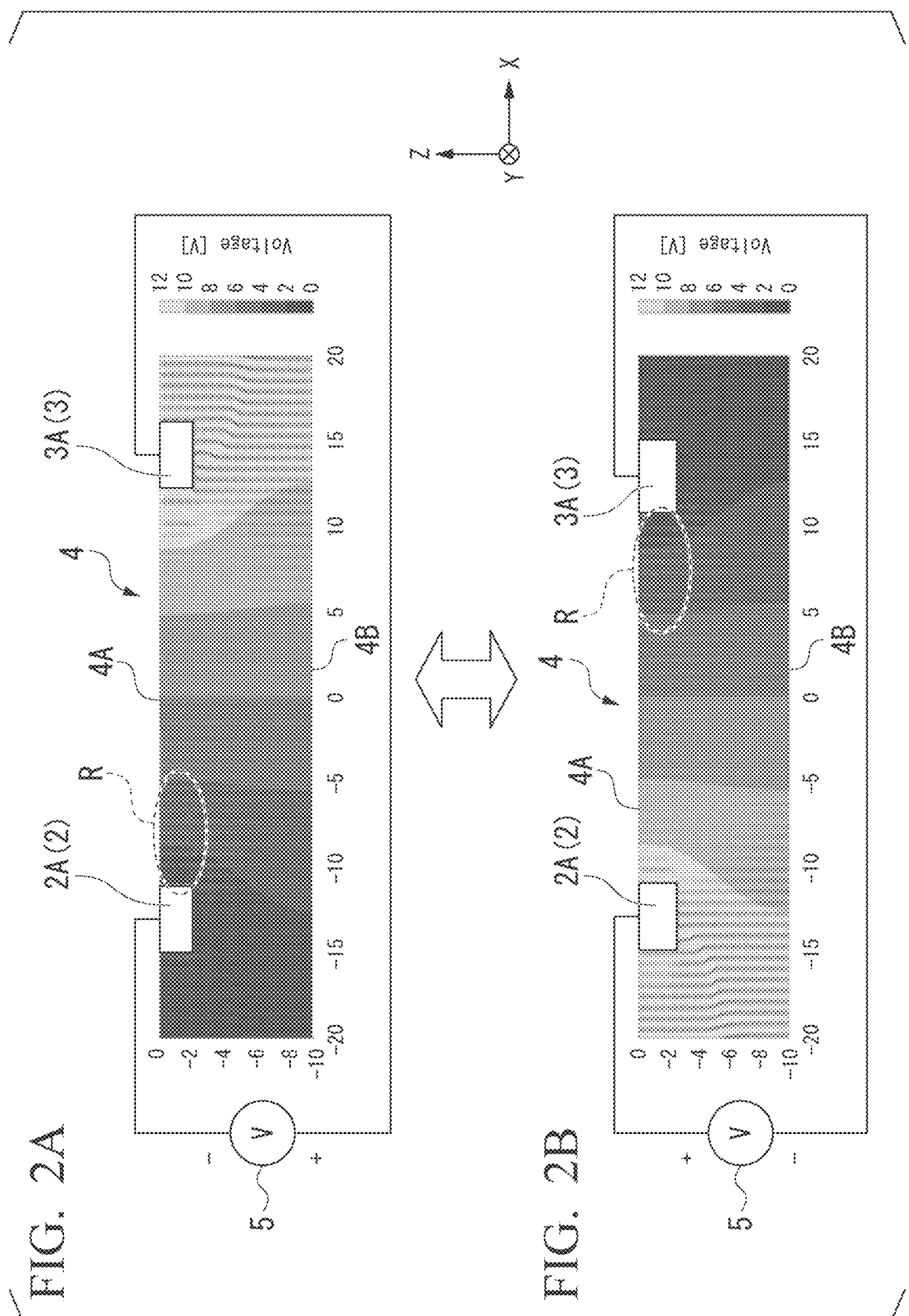
FIGS. 2A and 2B are cross-sectional views showing an electric field distribution of the object adhesion/peeling device according to the first embodiment.

FIG. 2 shows the electric field distribution in a part of the cross section of the object adhesion/peeling device 1. The first comb-teeth electrode 2A and the second comb-teeth electrode 3A are arranged to be separated from each other in the surface direction (X-axis direction) orthogonal to the normal direction (Z-axis direction) of the adhesive sheet 4 on the first surface 4A side of the adhesive sheet 4. The gap between the first comb-teeth electrode 2A and the second comb-teeth electrode 3A is made sticky by the adhesive sheet 4 and it can be adhered to the fixation target surface. Further, the second surface 4B side of the adhesive sheet 4 is also an adhesive surface, and the adhesion target object can be adhered thereto. The adhesion target object and the fixation target surface do not have to be conductive, and may be made of any one of an insulator, a dielectric, a resistor, and a conductor. The first comb-teeth electrode 2A and the second comb-teeth electrode 3A may be provided in advance on the adhesive sheet 4 side, or may be provided on the fixation target surface side.

When a voltage is applied between the first comb-teeth electrode 2A and the second comb-teeth electrode 3A, an electric field is generated in the direction (X-axis direction) orthogonal to the layer thickness direction (Z-axis direction) of the adhesive sheet 4. When the first comb-teeth electrode 2A is on the cathode side when AC voltage is input from the power supply portion 5 (see the part (A) of FIG. 2), in the gap between the first comb-teeth electrode 2A and the second comb-teeth electrode 3A, a region adjacent to the first comb-teeth electrode 2A becomes a hydrogen generation region R in which the hydrogen bubbles are generated. When the second comb-teeth electrode 3A is on the cathode side when the AC voltage is input from the power supply portion 5 (see the part (B) of FIG. 2), in the gap between the first comb-teeth electrode 2A and the second comb-teeth electrode 3A, a region adjacent to the second comb-teeth electrode 3A becomes the hydrogen generation region R in which the hydrogen bubbles are generated.

In the hydrogen generation region R, a space is generated due to the generation of hydrogen bubbles, and the adhesive force between the adhesive sheet 4 and the fixation target surface decreases. Therefore, when the AC voltage is input to the first comb-teeth electrode 2A and the second comb-teeth electrode 3A from the power supply portion 5, the adhesive strength decreases in the hydrogen generation region R adjacent to the first comb-teeth electrode 2A and the second comb-teeth electrode 3A on the first surface 4A side of the adhesive sheet 4. In this case, the adhesive force on the first surface 4A side of the adhesive sheet 4 on which the first comb-teeth electrode 2A and the second comb-teeth electrode 3A are provided is relatively lower than the adhesive force on the second surface 4B side such that the first surface 4A side is selectively peeled off.

At this time, if the frequency of the AC voltage input by the power supply portion 5 is increased to be equal to or higher than a predetermined value, on the first surface 4A side of the adhesive sheet 4, migration of the electrolyte existing in an area between the first comb-teeth electrode 2A and the second comb-teeth electrode 3A does not follow. In this state, a sufficient amount of electrolyte cannot reach the first comb-teeth electrode 2A or the second comb-teeth electrode 3A, and the adhesive strength of the first surface 4A of the adhesive sheet 4 does not decrease such that the first surface 4A side is not peeled off from the fixation target surface. Accordingly, it is desirable that the frequency of the AC voltage input by the power supply portion 5 is equal to or less than 1 kHz based on the ion mobility indicating the amount of movement of the electrolyte present in the area between the first comb-teeth electrode 2A and the second comb-teeth electrode 3A. It is preferable that the frequency of the AC voltage input by the power supply portion 5 is equal to or less than 10 Hz in order to more reliably cause the peeling between the two electrodes.

Figure 3:
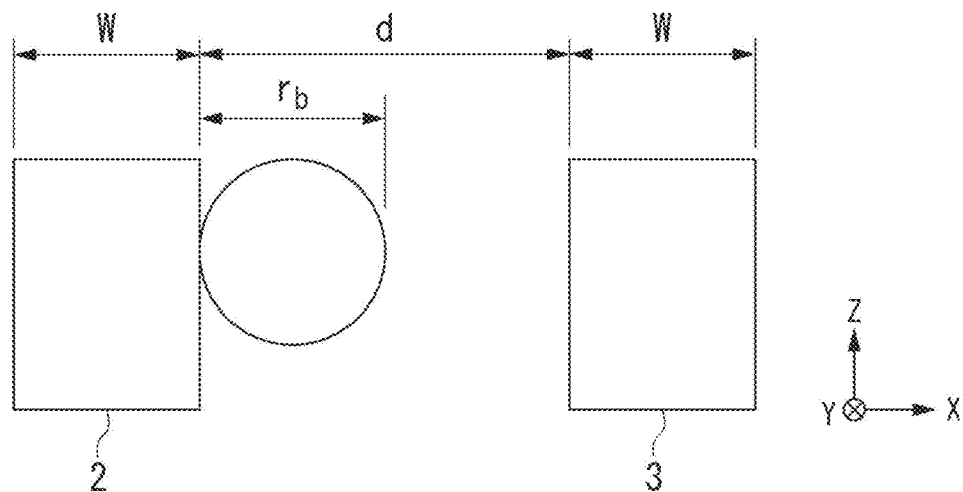
FIG. 3 is a view showing dimensions of a first electrode and a second electrode according to the first embodiment.

FIG. 3 shows the relationship between the electrode width and the separation distance of the first comb-shaped electrode 2A and the second comb-shaped electrode 3A in the short direction. Assuming that the electrode width W and the separation distance d of the first comb-teeth electrode 2A and the second comb-teeth electrode 3A in the short direction satisfy the following formula (1), it is possible to secure sufficient adhesive force on the first surface 4A side of the adhesive sheet 4.

$$W<d \quad (1)$$

Also, if the diameter of the hydrogen bubble in the hydrogen generation region R adjacent to the first comb-teeth electrode 2A and the second comb-teeth electrode 3A is referred to as a value rb, and the condition as shown in the following formula (2) is satisfied, a good peeling effect can be obtained on the first surface 4A side of the adhesive sheet 4.

$$D<2 \times rb \quad (2)$$

The separation distance d is not necessarily limited to the above relationship as long as it is within a range in which the effect of decreasing the adhesive force can be obtained. More preferably, it is desirable that the separation distance d satisfies the condition as shown in the following formula (3).

$$D<10 \times rb \quad (3)$$

It is desirable that the diameter rb of the hydrogen bubbles is about 100 μm. Therefore, the condition of the separation distance d can be set in the range equal to or less than 1000

µm, and is set in the range equal to or less than 200 µm in order to further improve the peelability.

Figure 4:
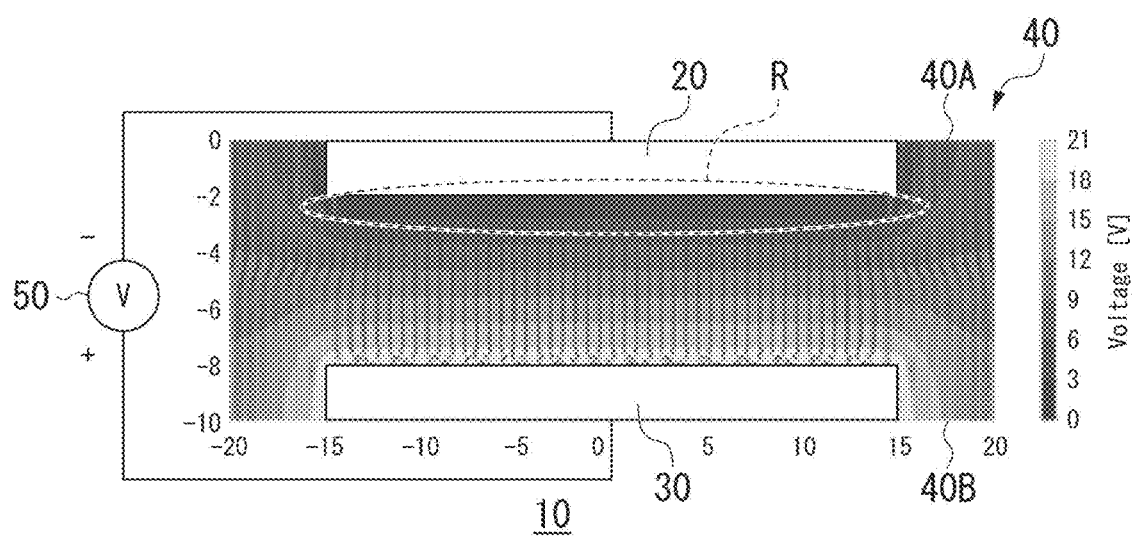
FIG. 4 is a cross-sectional view showing an electric field distribution of an object adhesion/peeling device according to a comparison example.

FIG. 4 shows an object adhesion/peeling device 10 according to a comparison example. In the comparison example, the same names are used for the same configurations as in the above-described embodiment, and the duplicate descriptions are appropriately omitted. The object adhesion/peeling device 10 according to the comparison example includes an adhesive sheet 40, a first electrode 20 and a second electrode 30. The first electrode 20 is provided on a first surface 40A side of the adhesive sheet 40, and the second electrode 30 is provided on a second surface 40B side. The first electrode 20 and the second electrode 30 are electrically connected to the power supply portion 50. In this configuration, the power supply portion 50 inputs a predetermined DC voltage to the first electrode 20 and the second electrode 30. Assuming that the first electrode 20 is on the cathode side, an area adjacent to the first electrode 20 and between the first electrode 20 and the second electrode 30 becomes a hydrogen generation region R where hydrogen bubbles are generated.

In a case in which the object adhesion/peeling apparatus 10 according to the comparison example is used for the fixation between the fixation target surface and the adhesion target object, at least one of the fixation target surface and the adhesion target object has to be formed of a conductor having the electrically conductive. Compared to the object adhesion/peeling device 10 according to the comparison example, according to the object adhesion/peeling device 1 according to the present embodiment, the fixation target surface and the adhesion target object is not necessarily to be the conductors, and may be formed as nonconductors.

Figure 5:
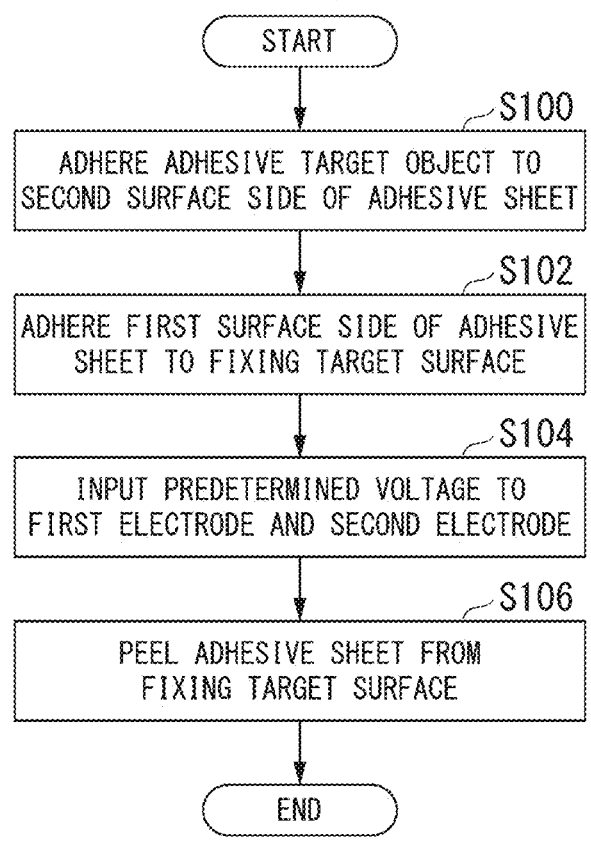
FIG. 5 is a flowchart showing a flow of procedures of an object adhesion/peeling method according to the first embodiment.

FIG. 5 shows each step performed in an object adhesion/peeling method. An adhesion target object is adhered to the second surface 4B of the adhesive sheet 4 having the first electrode 2 and the second electrode 3 provided on the first surface 4A side (step S100). The first surface 4A side of the adhesive sheet 4 is adhered to the fixation target surface (step S102). A predetermined voltage is input to the first electrode 2 and the second electrode 3 to generate a potential difference based on the predetermined voltage in a direction orthogonal to the layer thickness direction of the adhesive sheet 4 (step S104). An electrochemical reaction is caused on the first surface 4A side of the adhesive sheet 4, and the adhesive sheet 4 is separated from the fixation target surface together with the first electrode 2 and the second electrode 3 (step S106). The step S100 and the step S102 may be interchanged.

As described above, according to the object adhesion/peeling device 1, the adhesion target object can be temporarily adhered to the fixation target object, and the fixation target object can be peeled off without leaving any residue. According to the object adhesion/peeling device 1, since the plurality of first comb-teeth electrodes 2A and the plurality of second comb-teeth electrodes 3A are alternately arranged on the first surface side of the adhesive sheet 4, when the predetermined voltage is input to the plurality of first comb-teeth electrodes 2A and the plurality of second comb-teeth electrodes 3A, it is possible to generate the potential difference based on the predetermined voltage in a direction orthogonal to the layer thickness direction of the adhesive sheet so as to cause the electrochemical reaction on the first surface 4A side of the adhesive sheet 4 and peel off the adhesive sheet 4 from the fixation target surface without any residue remained on the fixation target surface.

According to the object adhesion/peeling device 1, the adhesive sheet 4 can be peeled off from the fixation target surface regardless of whether the fixation target surface is formed as a conductor or a non-conductor. According to the object adhesion/peeling device, the peelability of the adhesive sheet 4 can be improved by inputting the predetermined voltage with the predetermined frequency to the first electrode 2 and the second electrode 3. According to the object adhesion/peeling device 1, the peelability of the adhesive sheet 4 can be improved by setting the predetermined frequency within a range equal to or less than the predetermined value based on the ion mobility in the adhesive sheet 4.

Second Embodiment

An object adhesion/peeling device according to a second embodiment will be described below. In the following description, the same names and reference signs are used for the same configurations as in the first embodiment, and the duplicate descriptions are appropriately omitted.

Figure 6:
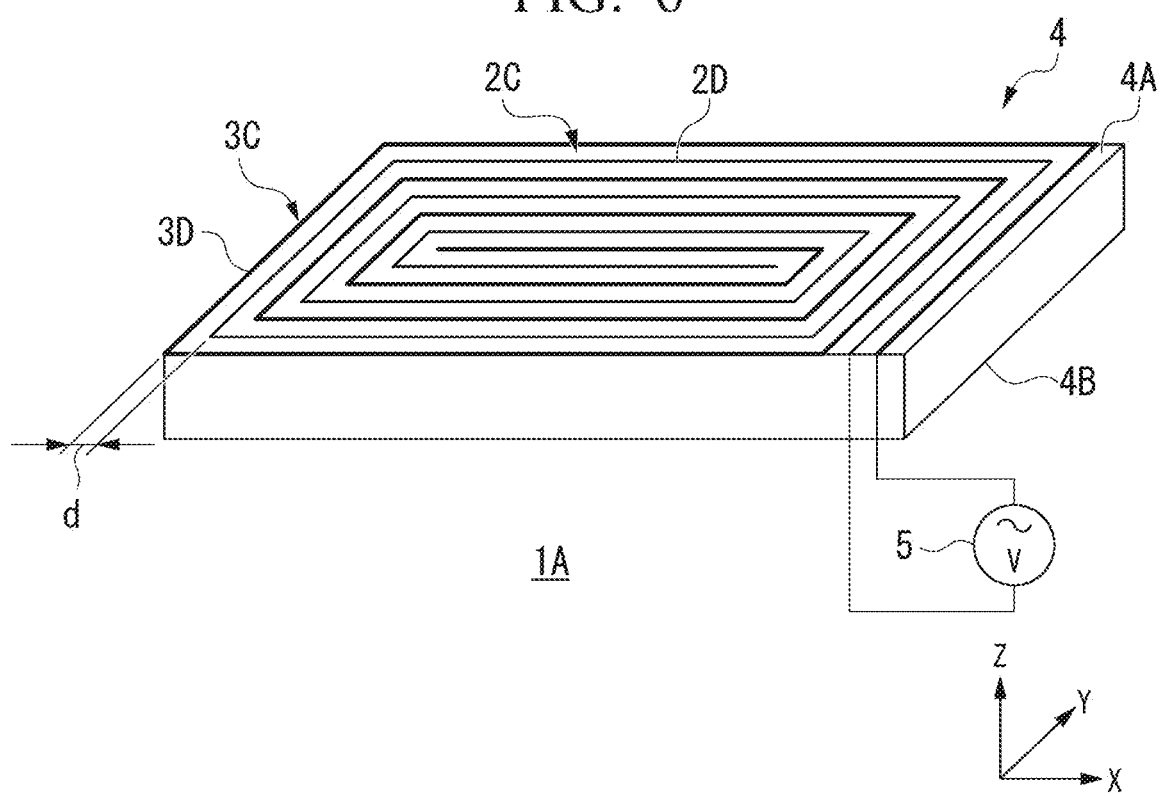
FIG. 6 is a perspective view showing a configuration of an object adhesion/peeling device according to a second embodiment.

As shown in FIG. 6, an object adhesion/peeling device 1A is provided with a first electrode 2C and a second electrode 3C on the first surface 4A side of the adhesive sheet 4. The first electrode 2C includes a first spiral electrode 2D in which a metallic first linear body is spirally arranged. The first spiral electrode 2D is formed in a spiral shape wound in a predetermined winding direction. The second electrode 3C has a second spiral electrode 3D in which a metallic second linear body is spirally arranged. The second spiral electrode 3D is formed in a spiral shape wound in the same predetermined winding direction as that of the first spiral electrode 2D. The first linear body and the second linear body are alternately arranged adjacent to each other. The first linear body and the second linear body are spaced apart by a separation distance d. A double spiral is formed by the first spiral electrode 2D and the second spiral electrode 3D.

According to the object adhesion/peeling apparatus 1A according to the second embodiment, by inputting a predetermined AC voltage to the first electrode 2C and the second electrode 3C from the power supply portion 5, a potential difference based on the predetermined voltage is generated in the direction (X-axis direction and Y-axis direction) to cause an electrochemical reaction on the first surface 4A side of the adhesive sheet 4, and the adhesive sheet 4 is peeled off from the fixation target surface without any residue remained on the fixation target surface.

According to at least one embodiment described above, the object adhesion/peeling device 1 includes the adhesive sheet 4 having adhesion surfaces on the first surface 4A side adhered to the fixation target surface and the second surface 4B side on which the adhesion target object is adhered, the first electrode 2 arranged on the first surface 4A side of the adhesive sheet 4, the second electrode 3 arranged adjacent to the first electrode 2 on the first surface side of the adhesive sheet 4, and the power supply portion 5 inputting the predetermined voltage to the first electrode 2 and the second electrode 3 to apply the potential difference between the first electrode 2 and the second electrode 3 so as to generate a potential difference based on the predetermined voltage in the direction orthogonal to the layer thickness direction on the first surface 4A side of the adhesive sheet 4, cause the electrochemical reaction in the adhesive sheet 4, and peel off the adhesive sheet 4 from the fixation target surface, thereby temporarily adhering the adhesion target object to the fixation target object while peeling off the fixation target object without any residue remained.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What claimed is:

1. An object, adhesion/peeling method, comprising:
   adhering an adhesion target object to a second surface side of an adhesive sheet, wherein the adhesive sheet includes adhesive surfaces on a first surface side and the second surface side, and a first electrode and a second electrode provided to be adjacent to the first electrode are provided on the first surface side;
   adhering the first surface side of the adhesive sheet to a fixation target surface;
   inputting a predetermined voltage to the first electrode and the second electrode to generate a potential difference based on the predetermined voltage in a direction orthogonal to a layer thickness direction of the adhesive sheet; and
   causing an electrochemical reaction on the first surface side of the adhesive sheet to peel off the adhesive sheet from the fixation target surface.

2. The object adhesion/peeling method according to claim 1, wherein the predetermined voltage is an AC voltage having a predetermined frequency.

3. The object adhesion/peeling method according to claim 2, wherein the predetermined frequency is equal to or less than 1000 Hz.

4. The object adhesion/peeling method according to claim 1, wherein the adhesive sheet is formed of an electro-peeling adhesive layer including an acrylic polymer, an ionic liquid that is contained in the acrylic polymer and exhibits a predetermined ionic conductivity, and a migration promoter that promotes migration of the ionic liquid.

5. The object adhesion/peeling method according to claim wherein the first electrode and the second electrode are arranged by a separation distance less than 1000 µm.

6. The object adhesion/peeling method according to claim 5,
   wherein the first electrode and the second electrode are formed of linear bodies having a predetermined electrode width, and
   the electrode width is formed to be smaller than the separation distance.

7. The object adhesion/peeling method according to claim 1,
   wherein the first electrode includes a plurality of first comb-teeth electrodes arranged in parallel and electrically connected in parallel,
   the second electrode includes a plurality of second comb-teeth electrodes arranged in parallel and electrically connected in parallel, and
   each of the plurality of first comb-teeth electrodes and the plurality of second comb-teeth electrodes are alternately arranged adjacent to each other.

8. The object adhesion/peeling method according to claim 1,
   wherein the first electrode includes a first spiral electrode in which a first linear body is spirally arranged,
   the second electrode includes a second spiral electrode in which a second linear body is spirally arranged, and
   the first linear body and the second linear body are alternately arranged adjacent to each other to form a double spiral.

9. An object adhesion/peeling device, comprising:
   an adhesive sheet including adhesive surfaces on a first surface side to which a fixation target surface is adhered and a second surface side to which an adhesion target object is adhered;
   a first electrode arranged on the first surface side of the adhesive sheet;
   a second electrode arranged on the first surface side of the adhesive sheet to be adjacent to the first electrode; and
   a power supply portion that inputs a predetermined voltage to the first electrode and the second electrode to apply a potential difference between the first electrode and the second electrode so as to generate the potential difference based on the predetermined voltage and cause an electrochemical reaction in the adhesive sheet to peel off the adhesive sheet from the fixation target surface.

* * * * *